Figure 1:
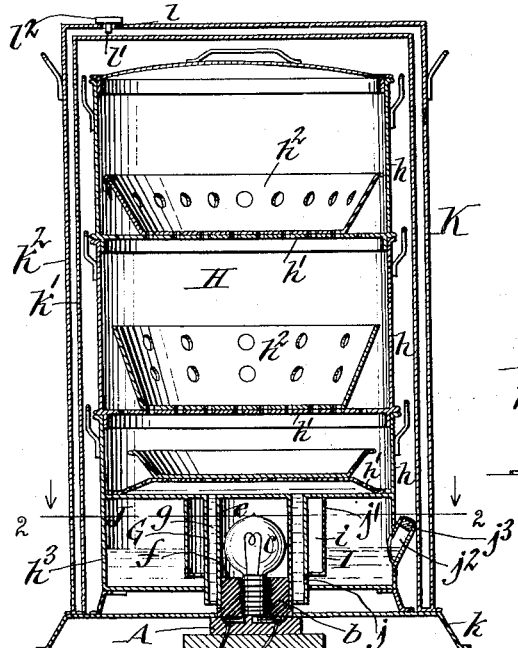

F. C. PERKINS.
ELECTRIC HEATER AND COOKING APPARATUS.
APPLICATION FILED MAY 10, 1909.

952,941.

Patented Mar. 22, 1910.

2 SHEETS—SHEET 1.

Witnesses:
J. Milton Jester
Richard Sommer

Inventor
Frank C. Perkins

F. C. PERKINS.
ELECTRIC HEATER AND COOKING APPARATUS.
APPLICATION FILED MAY 10, 1909.
952,941.  Patented Mar. 22, 1910.
2 SHEETS—SHEET 2.
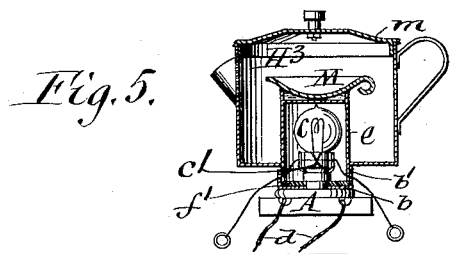
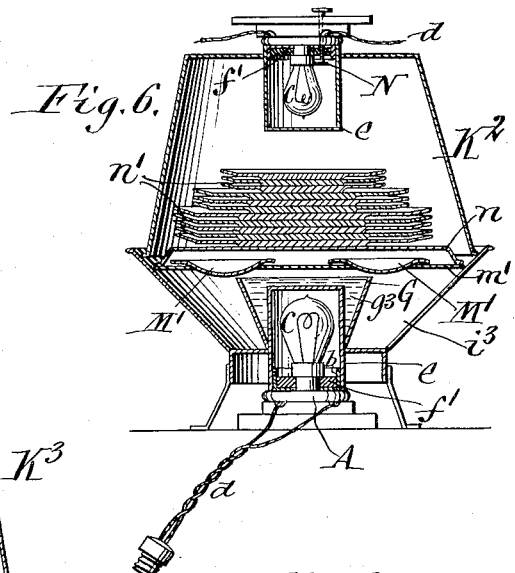
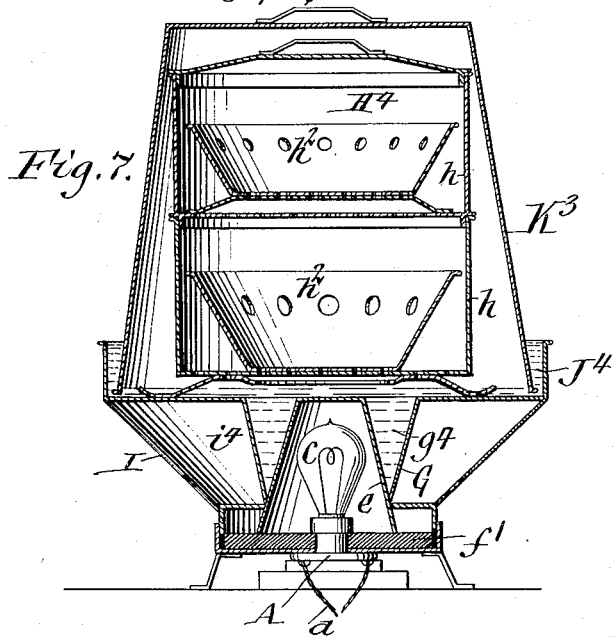
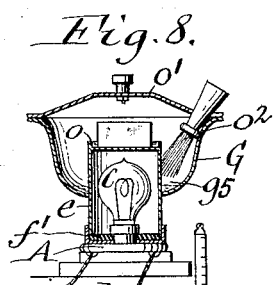
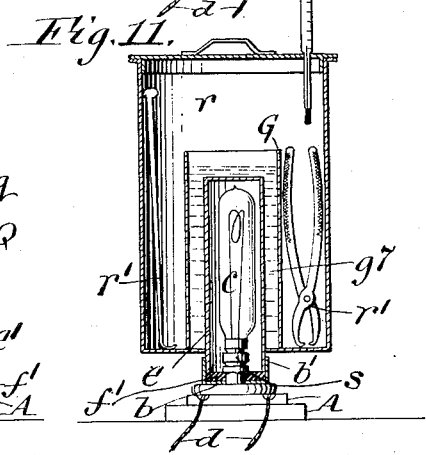
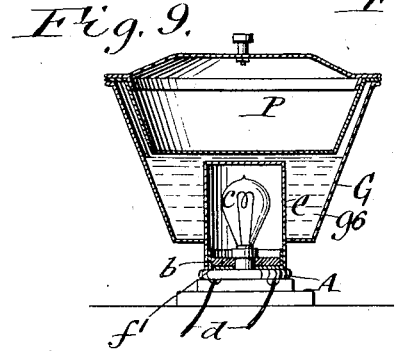
Witnesses:—
J. Milton Jester.
Richard Sommes.
Inventor.
Frank C. Perkins

UNITED STATES PATENT OFFICE.

FRANK C. PERKINS, OF BUFFALO, NEW YORK, ASSIGNOR OF ONE-HALF TO FERDINAND E. FINSTERBACH, OF BUFFALO, NEW YORK.

ELECTRIC HEATER AND COOKING APPARATUS.

952,941.　　　　　Specification of Letters Patent.　　Patented Mar. 22, 1910.

Application filed May 10, 1909. Serial No. 495,093.

*To all whom it may concern:*

Be it known that I, FRANK C. PERKINS, a citizen of the United States, residing at Buffalo, in the county of Erie and State of New York, have invented a new and useful Improvement in Electric Heaters and Cooking Apparatus, of which the following is a specification.

This invention has for its object the production of a simple, cheap and efficient electric heating and cooking apparatus whereby food may be cooked and material heated to temperatures of 300 degrees Fahrenheit or thereabout with comparatively small loss in heat.

It is well known that water is a good insulator of heat when circulation is interfered with and is also a great absorber of heat. For instance, a test tube several inches long filled with water may be held in the hand without discomfort at the lower end while the water in the upper portion may be boiling at 212 degrees F. from the heat of a Bunsen burner flame. In ordinary steam cookers and other similar devices where a quantity of water is heated in order that the same does not boil dry, a large amount of heat is wasted when the cooking has been accomplished by throwing away this water which has absorbed a large amount of heat. All of the water must be heated to the temperature of 212 degrees or thereabout before any of it will boil when the heat is applied from the bottom and good circulation is provided. For cooking the actual amount of heat required is very small as compared with the heat lost by radiation and absorbed by the water when discarded after the cooking has been accomplished.

This invention has for its object the heating to the boiling point or thereabout of only a small film or thin layer of water, the vapor or steam arising from the same doing the cooking in the steamer while the remaining quantity of water is at a much lower temperature and is utilized only as a source of supply or storage while it is at the same time absorbing heat which is ordinarily wasted by radiation.

It is the principle of the fireless cooker that the large amount of heat absorbed by a body of water when brought to the boiling point is given up by the food to be cooked when the whole is inclosed in a chamber well insulated by straw, asbestos or other material which prevents the heat from escaping to the outside of the cooker.

It is well known that dead air space or rarefied air is one of the best heat insulators and this is taken advantage of in this invention by providing rarefied air or vacuum chambers or outer shells with air spaces between the same for retaining the heat, or mineral wool or asbestos in double wall shells, the water boiling in the center of my improved electric heater and cooker, while the outer shell is comparatively cold.

While with the ordinary fireless cooker the heat is all first absorbed by the water heated by a flame and then given off to the food during the night, the electric cooker applies only a small amount of heat electrically and continuously for a considerable length of time, the food being hot and ready for service in the morning. With the ordinary fireless cooker not only must outside heat be applied to boil the water in the first place but the food while thoroughly cooked must still be reheated a trifle before serving.

Figure 3:
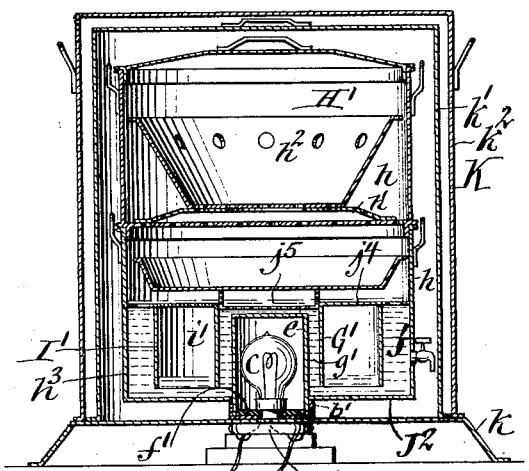
Figure 2:
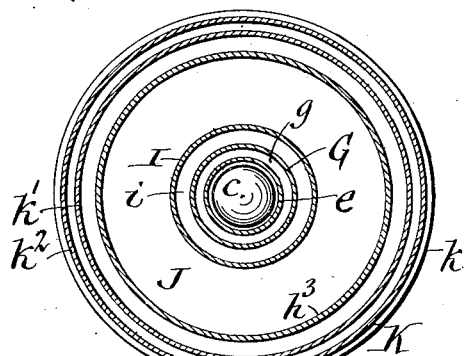
Figure 4:
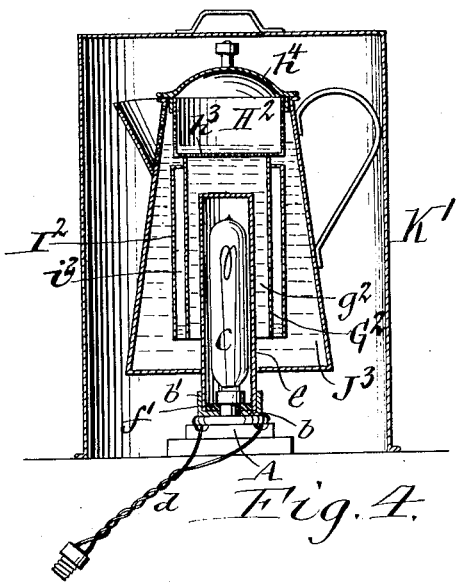

In the accompanying drawings consisting of two sheets: Figure 1 is a vertical section of a multiple vapor or steam cooker showing one form of my invention. Fig. 2 is a horizontal section in line 2—2, Fig. 1. Fig. 3 is a vertical section showing another form of cooker embodying my invention. Fig. 4 is a similar view showing my improved heater adapted for cooking coffee or the like. Fig. 5 is a similar view showing my invention applied to a cooking and heating device and provided with a resistance heat regulating socket between the support and the heating lamp. Fig. 6 shows a construction embodying my invention and utilizing a thermostat plug for controlling the temperature. Fig. 7 is a similar view showing a construction similar to Fig. 1 but having the water storage chamber next to and surrounding the heat insulating shell. Fig. 8 is a similar view showing my invention adapted for heating the water for shaving purposes. Fig. 9 is a similar view showing my invention applied to a cooking vessel having a water jacket. Fig. 10 is a similar view showing my invention adapted for heating a hair curling iron. Fig. 11 is a similar view showing my invention embodied in a heater for sterilizing dental or other instruments.

Similar letters of reference indicate corresponding parts throughout the several views.

The electric heater which embodies my invention comprises a base A which is preferably constructed of porcelain but may consist of other suitable heat insulating non-combustible material, a support $b$ having preferably the form of a collar mounted on the base and constructed of porcelain or other suitable reflecting non-combustible material, an incandescent electric lamp $c$ mounted on the support and having electric supply wires or connections $d$, and a heat absorbing shell $e$ preferably of metal and of cylindrical form inclosing the lamp and mounted on said support. The latter is preferably blackened or darkened on its inner side in any suitable manner, so that the same has a dark lining which causes the shell to absorb the heat of the lamp rays and transmit the same to the water or other material surrounding the shell by conduction. The shell may either be secured at its lower end around the periphery of the support $b$, as shown in Figs. 1, 6 and 9, a projecting rim forming a stop at the bottom or the same may be secured within an annular flange $b^1$ on the periphery of the support, as shown in Figs. 3, 4, 8, 10 and 11. The rays of the lamp are preferably reflected upwardly and to the side so as to increase the heating efficiency of the heater. This reflection of heat may be obtained by constructing the support $b$ of white material or coating its upper side or surface $f$ with a white or light material in the case of the construction shown in Fig. 1, or if desired this reflecting effect may be produced by means of an asbestos washer $f^1$, as shown in the remaining figures, this washer having the added advantage of preventing the heat from being dissipated downwardly through the support and base and becoming lost.

Referring to the construction shown in Fig. 1, $g$ represents an annular upright water heating chamber which is formed between the outer side of the heat absorbing shell $e$ and a cylindrical shell G surrounding the absorbing shell but separated therefrom by an intervening space. The water heating chamber is adapted to contain a thin layer or body of water or other heat translating medium which may be quickly heated to a steaming temperature by the heat derived from the inner shell $e$. At its upper end this water heating chamber opens into the lower end of a cooking chamber H which may be of any suitable construction that shown in Fig. 1 consisting of a plurality of superposed sections $h$ which are provided with the perforated shelves, floors or partitions $h^1$ so that the steam generated by heating of the water in the chamber $g$ will cook the victuals in the dishes $h^2$ supported on the several shelves. In Fig. 1 the water heating chamber is surrounded by an annular insulating air or steam chamber or jacket $i$ which is formed by means of a cylindrical shell I surrounding the water heating shell but separated therefrom by an intervening space. Around the air or steam chamber is a water storage chamber J which is preferably formed by an outer wall $h^3$ connected with the lowermost section of the heater and cooker and which communicates at its lower end by an opening $j$ in the shell G with the lower end of the water heating chamber and at its upper end by an opening $j^1$ in the shell I with the upper end of the air chamber $i$. The outer side of the storage chamber is provided about midway of its height with a filling opening or nozzle $j^2$ through which the storage chamber may be replenished with water from time to time as required and which is normally closed by a plug or stopper $j^3$. The air or steam in the jacket $i$ serves as an insulator which prevents rapid transmission of heat from the steaming chamber to the storage chamber. As the air in the upper parts of the insulating chamber and storage chamber becomes heated and expands, the water in the storage chamber is forced from the same through the lower opening $j$ into the steaming chamber, thereby replenishing the water therein which has evaporated. As the fresh and comparatively cool water in the storage chamber enters the steaming chamber and the temperature therein is lowered, the expansion of the air in the insulating chamber and storage chambers is reduced, thereby arresting the feed of water to the steaming chamber. By this means the water to the steaming chamber is supplied automatically and regulated according to the temperature of the water in the same. For the purpose of further conserving the heat within the cooking chamber and heater, the same as a whole are inclosed by a heat insulating single or double cover, casing, bell or hood K which is placed over the cooking chamber and heater and rests with its lower edge on a sub-base $k$ which preferably forms part of the heating base, although the same may be made independent thereof and of double walls rising half way the height of steamer to meet cover. The insulating cover preferably consists of inner and outer shells $k^1$, $k^2$ of sheet metal enameled which are separated by an intervening space from which the air may be partially or entirely exhausted or the same may be filled with gas, mineral wool, felt, asbestos or similar material which is a good heat insulator. A simple and inexpensive way of rarefying the air in the space between the cover shells or sections, as shown in Fig. 1, consists in providing the outer enamel or granite ware shell, preferably its top part with an opening $l$ which loosely receives a tapered valve or the shank $l^1$ of a rivet having a head $l^2$ which rests against the outer side of the respective cover shell, so as to operate as a valve. This metal shell and head are coated with a homogeneous silicate enamel or other cement, so that upon heating the cover or enamel or granite ware shell in the furnace the expansion of the air therein causes the same to escape from the air space through the opening $l$ and lift the valve $l^1$, $l^2$ and when this heating is terminated the head $l^2$ of the valve is pressed down by the outer air pressure or by a rod and secured by the cement or silicate enamel to the cover, so that the opening cannot be uncovered, thereby hermetically sealing the vacuum or rarified air space between the shells of the cover while the air is rarefied therein and causing the same to operate more effectively as a heat insulator. When the cover is coated with a silicate enamel the operation of expelling the air therefrom and sealing the valve of the air outlet opening can be accomplished while baking the cover in the kiln or oven, thereby securing the additional heat insulating capacity in the cover without any expense of pumping out the air and sealing. Where joints are loosely made the tapered valve or rivet may be omitted, the expanding air passing through the joints on being heated; the latter being filled by the enamel forced into the joint in cooling by the outside air pressure. Tin double shells may also be used, the joints being soldered, the air being expelled by heating the shell but to a far lower degree than with the enamel process.

In the construction of my improved heater shown in Fig. 3, a small quantity of water is subjected to the action of the heater and is insulated from the storage water in the storage chamber the same as in Fig. 1. In this modified construction no communication is established between the upper part of the top of the storage chamber and the upper part of the insulating air chamber but communication is established between the lower end of the insulating air chamber $i^1$ and the lower ends of the steaming chamber $g^1$ and the storage chamber $J^1$. This is preferably secured by means of a horizontal diaphragm $j^1$ which fits removably within the outer wall $h^5$ of the storage chamber and is provided with two depending annular shells or walls $G^1$, $I^1$ arranged concentrically relatively to the heat absorbing shell but terminating at their lower ends short of the bottom $J^2$ which connects the outer wall of the storage chamber with the heat absorbing shell. When the air in the chamber $i^1$ becomes heated by the steaming water between the shell $G^1$ and the heat absorbing shell $e$, the water below the same is forced downwardly and caused to flow upwardly through the steaming chamber and into the cooking chamber $H^1$ above the same where the steam given off cooks the victuals in the vessels within this cooking chamber. If the diaphragm $j^1$ is not pressed down so that water overflows same there is no circulation and water in the steaming chambers acts like water in top of test tube, boiling while storage water remains cool. If the diaphragm $j^1$ is pressed farther down, circulation takes place over the top and down the outer storage chamber, in which case coffee may be made in the perforated cup $j^5$ over the steaming chamber.

In the construction shown in Fig. 4, my invention is organized to serve as a percolating coffee pot, on the principle just mentioned, the steaming chamber, $g^2$, water storage chamber $J^3$ and insulating air chamber $i^2$ being substantially the same as in the construction shown in Fig. 3 but the cooking chamber $H^2$ has the form of a cup, its bottom $h^3$ resting on the walls or partitions $G^2$, $I^2$ of the steaming and insulating air chambers. The interior of the cup which receives the ground coffee is in communication with the steaming chamber and water storage chamber by perforations in its bottom $h^3$ and sides and the top of the cup being normally closed by a lid $h^4$. The whole is inclosed by an ordinary single shell cover $K^1$ while the cooking of the coffee is in progress. As the water rises in the steaming chamber it mixes with the ground coffee in the cup and produces the beverage. If hot water is poured into the cup $H^2$ containing the coffee, it drips through the coffee, acting as a drip coffee pot, and the action hastened, circulation taking place then by the electric heat, the percolating effect taking place as the water rises through the coffee. If desired, the fine ground coffee may be placed in the steaming chamber and around the heat absorbing shell, the circulation taking place in the same manner.

When only a small amount of water is required, as in the case of poaching one egg at a time, the egg cup M is supported on a water basin on top of the heat absorbing shell $e$ and inclosed by a cooking chamber $H^3$ having a removable lid $m$, and forming a tea pot, as shown in Fig. 5.

For regulating the heat of the lamp, a resistance socket $c^1$ may be arranged between the lamp and its support, as shown in Fig. 5. In the last mentioned construction a resistance heat regulating socket $M^1$ is employed between the heating lamp and its support.

When several eggs are to be poached at a time, a plurality of egg cups $M^1$ may be supported on the top of a perforated tray $m^1$, which forms the top of an air or steam chamber $i^3$ inclosing a water basin $g^3$ surrounding the heat absorbing shell. This last mentioned construction may also be utilized without water as a plate warmer, by placing a shelf $n$ on the tray $m^1$ for supporting the plates $n^1$ or other dishes and inclosing the latter by an inverted bell $K^2$. The latter may be provided in its top with an electric heater, as shown in Fig. 6, similar to that in the lower part of the apparatus for increasing the heat in the plate warming chamber. The electric circuit through the last mentioned lamp is automatically controlled by a thermostatic switch N between the lamp and its support.

In the construction shown in Fig. 7, the storage chamber $J^4$ is formed by enlarging the upper end of the steaming chamber $g^4$, the latter being surrounded by an insulating air chamber $i^4$. The cooking chamber $H^4$ is supported above the storage chamber $J^4$ and is inclosed by an inverted bell or cover $K^3$ which dips with its lower end in the water of the storage chamber $J^4$, so that the compressed air, steam or vapor within the cover forces the water into the space outside of the cover where the water is comparatively cool while the water in the central steaming chamber is hot, thereby automatically supplying water.

In Fig. 8 a soap holder $o$ is arranged on top of the heat absorbing shell and the latter is surrounded by a water chamber $g^5$ having a cover $o^1$ with an opening through which a brush $o^2$ may be inserted thus serving as an electric shaving cup. Instead of placing water in the chamber $o$ the same may be filled with sealing wax for keeping the same in a fluid condition.

In Fig. 9 a covered pot P for containing the article to be cooked or heated is suspended in the upper end of a steaming or water chamber $g^6$ which surrounds the heat absorbing shell. This last mentioned construction is well suited for cooking cereals or heating and melting glue without burning them.

Fig. 10 shows a shell $e^1$ inclosing a lamp and provided with openings $q$ in its top for the reception of hair curling irons Q which are to be heated.

In Fig. 11 a steaming or water chamber $g^7$ surrounds the heat absorbing shell and opens at its upper end into a covered chamber $r$ which surrounds the water chamber and is adapted to receive dental or other instruments $r^1$ which are to be sterilized by steam vapor at 180° or more. This last mentioned construction has a thermostatic plug $s$ between the lamp and its support for automatically controlling the heat of the lamp.

I claim as my invention:

1. An electric heater comprising a cylindrical non-combustible base, a non-combustible reflecting collar arranged on the base, a lamp arranged in center of the collar, and a metal heat absorbing shell surrounding said lamp directly.

2. An electric heater comprising a cylindrical non-combustible base, an electric lamp mounted on the base, a non-combustible reflecting collar, a metal heat absorbing shell inclosing said lamp directly, and a resistance heat regulator of said lamp.

3. An electric heater comprising a cylindrical non-combustible base, an electric lamp mounted on the base, a non-combustible reflecting collar, a metal heat absorbing shell inclosing said lamp directly, an electric heater having an electric lamp, and a thermostat for regulating the temperature.

4. An electric heater comprising a cylindrical non-combustible base, a non-combustible reflecting collar arranged on the base, a lamp arranged in the center of the collar, and a heat absorbing shell surrounding said lamp directly and secured at its lower edge to said collar, the inner side of said shell being darkened.

5. An electric heater comprising a heating element, a heat absorbing shell having a darkened lining surrounding said element, a steaming chamber surrounding said shell and adapted to contain water, and a cooking chamber communicating with the upper end of the steaming chamber.

6. An electric heater comprising a heating element, a heat absorbing shell having a darkened lining surrounding said element, a steaming chamber surrounding said shell and adapted to contain water, a cooking chamber communicating with the upper end of the steaming chamber, and means supplying said steaming chamber with water.

7. An electric heater comprising a heating element, a heat absorbing shell having a darkened lining surrounding said element, a steaming chamber surrounding said shell and adapted to contain water, a cooking chamber communicating with the upper end of the steaming chamber, and a water storage chamber communicating with the lower end of the steaming chamber and having a filler through which the same may be replenished.

8. An electric heater comprising a heating element, a heat absorbing shell having a darkened lining surrounding said element, a steaming chamber surrounding said shell and adapted to contain water, a cooking chamber communicating with the upper end of the steaming chamber, a water storage chamber connected with the steaming chamber, and an insulating air chamber interposed between said steaming chamber and storage chamber.

9. An electric heater comprising a heating element, a heat absorbing shell having a darkened lining surrounding said element, a steaming chamber surrounding said shell and adapted to contain water, a cooking chamber communicating with the upper end of the steaming chamber, an insulating air chamber surrounding the steaming chamber, and a water storage chamber connected at its top with the upper part of the insulating chamber and at its lower end with the lower end of the steaming chamber.

10. An electric heater comprising a heating element, a heat absorbing shell having a darkened lining surrounding said element, a steaming chamber surrounding said shell and adapted to contain water, a cooking chamber communicating with the upper end of the steaming chamber, an insulating air chamber surrounding the steaming chamber, a water storage chamber connected at its top with the upper part of the insulating chamber and at its lower end with the lower end of the steaming chamber, and a cover adapted to inclose the cooking chamber.

11. An electric heater comprising a heating element, a heat absorbing shell having a darkened lining surrounding said element, a steaming chamber surrounding said shell and adapted to contain water, a cooking chamber communicating with the upper end of the steaming chamber, an insulating air chamber surrounding the steaming chamber, a water storage chamber connected at its top with the upper part of the insulating chamber and at its lower end with the lower end of the steaming chamber, and a cover adapted to inclose the cooking chamber and having inner and outer shells forming an intervening space for a heat insulating medium.

12. An electric heater comprising a cooking chamber, and a cover adapted to inclose the cooking chamber and having inner and outer shells forming an intervening air space and one of said shells containing an air outlet opening, and a closure for said opening which is opened by the escape of air from said air space.

13. An electric heater comprising a cooking chamber and a cover adapted to inclose the cooking chamber and having inner and outer shells forming an intervening air space and one of said shells containing an air outlet opening, and a closure for said opening which is opened by the escape of air from said air space and which is sealed by an adhesive when closed after the cover is heated.

Witness my hand this 8th day of May, 1909.

FRANK C. PERKINS.

Witnesses:
ANNA HEIGIS,
E. M. GRAHAM.